Patented Aug. 13, 1940

2,211,240

UNITED STATES PATENT OFFICE 2,211,240

SYNTHESIS OF SUCCINONITRILE

Alexander Douglas Macallum, Niagara Falls, N. Y., assignor to E. I. du Pont de Nemours & Company, Wilmington, Del., a corporation of Delaware No Drawing. Application August 17, 1938, Serial No. 225,486

3 Claims. (Cl. 260—464)

This invention relates to a process for preparing succinonitrile, more particularly by reacting an ethylene dihalide with an alkali cyanide.

It has been known that in the preparation of succinonitrile from ethylene dihalides and alkali cyanides, ethanol is an especially suitable reaction medium. The yields, however, have not been satisfactory, and attempts to improve the yields have so far failed. The best results heretofore have been obtained by adding a boiling concentrated aqueous solution of potassium cyanide to an ethanol solution of ethylene bromide. Attempts to increase the yields of this type of reaction by variation of the reaction temperature and time and of the alcohol concentration, such as with absolutely dry ethanol, have failed.

Applicant discovered the surprising fact that a material increase in the yield of succinonitrile in the reaction of the above described type can be obtained by carrying out the reaction in ethanol of about 90 to 98% concentration, preferably of about 95%, as reaction medium. This surprising fact seems to be due to the properties of the alkali metal cyanides as well as of succinonitrile. A study of the stability of alkali metal cyanides in ethanol of varying concentrations showed that with increasing alcohol concentration the stability of the cyanides increases. However, for the reaction of the alkali metal cyanides with the ethylene dihalides the total absence of water in the reaction medium seems to be disadvantageous, as has been shown by the failures in the use of anhydrous ethanol as reaction medium. Applicant has now found that by carrying out the reaction of the ethylene dihalide with alkali metal cyanide in ethanol of the above specified range of concentration, on the one hand sufficient stability is attained for the raw materials as well as for the final product, and on the other hand a sufficient reaction velocity due to the presence of small amounts of water can be obtained. It has been found that even when the amount of water present in the ethanol having a concentration of 90 to 98% is not sufficient to dissolve all the alkali metal cyanide, this amount of water is sufficient to dissolve enough of it in any phase of the reaction and on formation of succinonitrile dissolves further amounts of the alkali metal cyanide, thus providing sufficient solvent effect for the reaction.

The influence of the alcohol concentration on the stability of sodium cyanide is shown in the following table, where the results of tests are shown which were made by refluxing cyanide solutions in ethanol of varying concentrations over 10 hour periods.

| Alcohol concentration | Recovery of NaCN based on amount of NaCN added |
| --- | --- |
| 63.8 | 87 –88.2 |
| 76.4 | 93.5–94 |
| 95 | 99.9–100 |

The influence of the alcohol concentration on the effect of the process of my invention is illustrated in the following examples. Example 1 shows the reaction of ethylene dibromide and sodium cyanide in 63% ethanol, and the second example shows the reaction of these reactants in 95% ethanol.

Example 1

1500 grams ethylene bromide and 3000 cc. of 95% ethanol were stirred and refluxed in a 12 litre flask on a steam bath while adding dropwise a solution of 750 grams of sodium cyanide in 1200 cc. of water. The mixture was refluxed under stirring for six hours and the formed succinonitrile was separated from the reaction mixture. The separation of succinonitrile was effected by distilling off a major part of the ethanol and by extracting repeatedly the residue with methylene chloride under gentle boiling. In this way the methylene chloride extract can be made to float and can be readily siphoned off by suction. The methylene chloride extract then was dried with anhydrous sodium sulfate. The mixture then was filtered and distilled at ordinary pressure over steam to recover methylene chloride. The residue was subjected to fractional distillation at a pressure of 10 millimeters. The fraction distilling at 125–140° C. gave a yield of 372 grams of pure succinonitrile, corresponding to a yield of 63% based on the sodium cyanide used.

Similar results were obtained with 75% ethanol, the yield, however, being smaller and corresponding to a 52% yield based on the cyanide used.

Example 2

A mixture of 3000 cc. of 95% ethanol and 1500 grams of ethylene bromide were stirred and refluxed in a 12 litre balloon flask on a steam bath, the reflux condensate having been allowed to run back into the flask by way of a 2 litre extraction flask containing a charge of 750 grams of milled sodium cyanide. After about 40 hours' refluxing and stirring the mixture was cooled and the solids filtered off by suction. The filtrates were then evaporated to a small bulk and the residue was treated with methylene chloride and again evaporated. The evaporation residue was again extracted with methylene chloride. The final methylene chloride extract was dried with a few grams of anhydrous sodium sulfate, filtered, evaporated to a small bulk and fractionally distilled as described in Example 1. In the main fraction at 125 to 137° C. and at a pressure of 10 millimeters, 326.4 grams, and in the fraction of the still residue in about the same temperature range 4 grams of pure succinonitrile were recovered, corresponding to a yield of 90.5% based on the cyanide consumed. 254 grams of unchanged sodium cyanide were recovered in the reflux extraction residue and 6-7 grams of sodium cyanide were recovered from the reaction mixture and could be used in further runs or in any other desired manner. The higher yield of nitrile obtained here can be attributed to a substantial decrease in the amount of acrylonitrile, sodium succinate, formate, carbonate and hydrogen cyanide produced as by-products of the succinonitrile in this case.

My invention is not restricted to the specific procedure of the examples, and any other ethylene dihalide, such as ethylene dichloride or alkali metal cyanide, such as potassium cyanide, can be used. However, for best results the use of ethylene bromide and of sodium cyanide is to be preferred. It has been found that methylene chloride is an especially advantageous extraction means for the formed succinonitrile, but also any other suitable extraction means may be utilized, such as for example ethylene chloride, isopropanol, n-propanol or benzene.

The process of my invention alternatively can be carried out by adding the cyanide directly to the concentrated ethanol halide mixture and stirring the resulting mixture while heating. Thus the reaction time can be substantially decreased, reaction times of 8 hours having been found to be sufficient. While the yield is substantially within the same range as in the above example, it is further possible to add the cyanide or the halide, or the cyanide and the halide, portionwise to the ethanol during the reaction. The reaction temperature can be changed within wide limits, lower as well as higher temperatures being suitable. The amount of ethanol should be sufficient to obtain a slurry which can be easily stirred. Moreover, the ethanol can be diluted to a certain degree with water-free inert diluents. Various other modifications will be apparent to those skilled in the art.

I claim:

1. The process of preparing succinonitrile comprising boiling a solution of an ethylene dihalide in ethanol of about 90 to 98% concentration, condensing the resulting ethanol vapors, contacting the condensate with a body of finely divided, anhydrous alkali metal cyanide and continuously passing the resulting weak ethanol solution of said cyanide into the aforesaid boiling ethanol solution and continuously boiling said solution until the reaction is substantially complete.

2. The process of preparing succinonitrile comprising boiling a solution of an ethylene dihalide in ethanol of about 95% concentration, condensing the resulting ethanol vapors, contacting the condensate with a body of finely divided, anhydrous alkali metal cyanide and continuously passing the resulting weak ethanol solution of said cyanide into the aforesaid boiling ethanol solution and continuously boiling said solution until the reaction is substantially complete.

3. The process of preparing succinonitrile comprising boiling a solution of ethylene dibromide in ethanol of about 95% concentration, condensing the resulting ethanol vapors, contacting the condensate with a body of finely divided, anhydrous sodium cyanide and continuously passing the resulting weak ethanol solution of said cyanide into the aforesaid boiling ethanol solution and continuously boiling said solution until the reaction is substantially complete.

ALEXANDER DOUGLAS MACALLUM.